United States Patent
Gorton et al.

(10) Patent No.: US 10,312,754 B2
(45) Date of Patent: Jun. 4, 2019

(54) INTERIOR PERMANENT MAGNET MOTOR AND ROTOR STRUCTURE THEREFORE

(71) Applicant: TRW Limited, Solihull, West Midlands (GB)

(72) Inventors: John Leslie Gorton, Birmingham (GB); David Julian Moule, Birmingham (GB); Gary Webb, Middlesex (GB)

(73) Assignee: TRW Limited, Solihull, West Midlands (GB)

( * ) Notice: Subject to any disclaimer, the term of this patent is extended or adjusted under 35 U.S.C. 154(b) by 467 days.

(21) Appl. No.: 15/121,918

(22) PCT Filed: Mar. 2, 2015

(86) PCT No.: PCT/GB2015/050595
§ 371 (c)(1),
(2) Date: Aug. 26, 2016

(87) PCT Pub. No.: WO2015/128678
PCT Pub. Date: Sep. 3, 2015

(65) Prior Publication Data
US 2017/0070108 A1    Mar. 9, 2017

(30) Foreign Application Priority Data
Feb. 28, 2014   (GB) ................................ 1403555.4

(51) Int. Cl.
  *H02K 21/12*   (2006.01)
  *H02K 1/27*    (2006.01)
  *H02K 15/03*   (2006.01)

(52) U.S. Cl.
  CPC ............. *H02K 1/276* (2013.01); *H02K 15/03* (2013.01)

(58) Field of Classification Search
  CPC ........... H02K 1/276; H02K 15/03; H02K 1/28
  (Continued)

(56) References Cited

U.S. PATENT DOCUMENTS 5,581,140 A    12/1996  Futami et al.
6,087,752 A *  7/2000   Kim ..................... H02K 1/2766
                                                310/156.56
(Continued)

FOREIGN PATENT DOCUMENTS

CN       1088364 A       6/1994
DE    102008041555 A1    3/2010
(Continued)

OTHER PUBLICATIONS

Great Britain Search Report, Application No. GB 1403555.4, dated Aug. 20, 2014.
(Continued)

*Primary Examiner* — Thanh Lam
(74) *Attorney, Agent, or Firm* — MacMillan, Sobanski & Todd, LLC

(57) ABSTRACT

A rotor structure for an interior permanent magnet electric motor comprising: A laminated rotor core which comprises stack of thin plates, the stack having a first end and a second end, each plate in the stack including at least one window which is aligned with a corresponding window of an adjacent plate so that the window together form an elongate pocket that extends along at least a part of the length of the core starting at a first end of the core, and at least one permanent magnet located in the pocket. At least one plate at the first end of the stack includes an integral retention feature which projects away from a main body of the plate to project above the window in the plate and which engages the first end of the magnet thereby to retain the magnet in the pocket.

12 Claims, 3 Drawing Sheets

(58) Field of Classification Search
USPC .................................................. 310/156.01
See application file for complete search history.

(56) References Cited

U.S. PATENT DOCUMENTS

| | | | | |
|---|---|---|---|---|
| 6,492,755 | B1* | 12/2002 | Jones ...................... | H02K 1/278 310/156.12 |
| 7,365,465 | B2* | 4/2008 | Ludwig .................. | H02K 1/278 310/156.12 |
| 2009/0001839 | A1* | 1/2009 | Masayuki .............. | H02K 1/278 310/156.16 |
| 2013/0106207 | A1* | 5/2013 | Song ...................... | H02K 1/278 310/43 |
| 2015/0236558 | A1* | 8/2015 | Oketani ................... | H02K 1/28 310/43 |

FOREIGN PATENT DOCUMENTS

| | | | |
|---|---|---|---|
| JP | 2011172441 | A | 9/2011 |
| JP | 2012170190 | A | 9/2012 |
| JP | 2013051795 | A | 3/2013 |
| WO | 2005043741 | A2 | 5/2005 |
| WO | 2008012271 | A1 | 1/2008 |
| WO | 2010046177 | A2 | 4/2010 |

OTHER PUBLICATIONS

PCT International Search Report and Written Opinion, Application No. PCT/GB2015/050595, dated Jul. 6, 2015.
Chinese First Office Action, Application No. CN 201580016952.5, dated Jan. 29, 2018.

* cited by examiner

US 10,312,754 B2

INTERIOR PERMANENT MAGNET MOTOR AND ROTOR STRUCTURE THEREFORE

CROSS-REFERENCE TO RELATED APPLICATIONS

This application is a national stage of International Application No. PCT/GB2015/050595 filed 2 Mar. 2015, the disclosures of which are incorporated herein by reference in entirety, and which claimed priority to Great Britain Patent Application No. 1403555.4 filed 28 Feb. 2014, the disclosures of which are incorporated herein by reference in entirety.

BACKGROUND OF THE INVENTION

This invention relates to interior permanent magnet motors of the kind comprising a laminated rotor core which includes pockets into which permanent magnets are located. It also relates to rotor structures for such motors and a method of fabricating a rotor structure.

Interior permanent magnet motors are known. A rotor structure of a typical prior art interior permanent magnet motor 1 is shown in FIG. 1 of the drawings. It comprises a rotor structure that connects to an output shaft 2 from which the output of the motor is taken. The rotor structure comprises a rotor core 3 formed from a stack of laminated plates. The core 3 has a central opening 4 that extends from a first end of the core to a second, opposing, end of the core and this enables it to be fixed around the shaft. The core in the example of FIG. 1 comprises three pucks 5, each comprising a stack of substantially identical thin metal plates 6 which are pressed together. The core may comprise just one, or perhaps two or more, pucks, the pucks being fixed together end to end form the complete stack.

Each of the plates 6 in the stack includes at least one opening or window 7. In the example there are eight of these openings, spaced evenly around the axis of the plate. The plates are held in the stack so that the windows in a plate align with corresponding openings in the adjacent plates as can be seen in FIG. 2. Each set of windows, from one end of a puck 6 to the other, forms a pocket 9. In an interior permanent magnet motor each pocket contains an elongate rare earth magnet 10, the shape of which is generally complimentary to the pocket so that it is a snug, but not interference, fit. The magnets are typically retained in the pockets with glue. Generally the length of the magnet is the same as the length of the stack, so that a first end of the magnet is aligned with a first end of the core and a second end of the magnet is aligned with a second end of the core. This gives the optimum magnetic properties for the rotor structure. In other arrangements, as shown in FIG. 2, they may be retained by adding an extra plate 11 to each end of a puck which has no windows, the plate sitting over the end of each magnet so that the laminated stack is slightly longer than the magnets.

BRIEF SUMMARY OF THE INVENTION

According to a first aspect the invention provides a rotor structure for an interior permanent magnet electric motor comprising:

a laminated rotor core which comprises stack of thin plates, the stack having a first end and a second end, each plate in the stack including at least one window which is aligned with a corresponding window of an adjacent plate so that the windows together form an elongate pocket that extends along at least a part of the length of the core starting at a first end of the core, and at least one permanent magnet located in the pocket, characterised in that at least one plate at the first end of the stack includes an integral retention feature which projects away from a main body of the plate to project above the window in the plate and which engages the first end of the magnet thereby to retain the magnet in the pocket.

The at least one plate may be the outermost, final, plate of the stack, or may be a plate 15 located beneath the outermost plate. For instance it may be a plate that is one plate below the outermost plate at the first end of the stack.

Every plate in the stack may have a window and the magnet may extend at least part way through the window in every plate. It may extend fully through every window so the end of the magnet is substantially aligned or exactly aligned with the first end of the stack.

The retention feature may retain the magnet so that an end face of the magnet is substantially flush with the face of the main body of the endmost plate of the stack that faces away from the s tack.

The main body of the plate may comprise a substantially flat plate having opposed upper and lower planar faces.

The retention feature may comprise a deformable tab which is deformed out of the plane of the main body by the magnet during assembly so that the tab applies a compressive force to the magnet biasing it in a direction away from the first end of the stack.

The plate, being a generally flat sheet of material, has two major opposing surfaces that extend perpendicular to the axis of the motor rotor core, spaced apart by a small distance of perhaps 1 mm or 2 mm or so. Deformation out of the plane in the context of this application means that a part of the plate is axially offset from the rest by a sufficient distance that it lies outside of the two planes in which the opposing surfaces lies. As such, when viewed along the surface the retention feature will be visible protruding above that surface.

Where the tab is deformed out of the plane of the plate the end of the magnet may be flush with the face of the plate.

In an alternative, the tab may extend across the window and the tab and magnet may be shaped so that the tab, when holding the magnet, does not protrude beyond the face of the plate, i.e. beyond the end of the puck. This is advantageous because the pucks can be stacked either way up since both end faces can be flat. By providing a suitable recess in the magnet, the magnet may remain flush with the end face of the plate. If no recess is provided, the magnet will extend only part way through the plate, the amount dependent on the thickness of the tab.

The tab may, for example, have a thickness of between a quarter and a half or the thickness of the plate, or perhaps a little less or more than the extremes of that range. For instance, with an end plate of 0.5 mm thickness a tab of approximately 0.25 mm thickness may be provided.

The tab may be formed using a planishing process with one face of the tab flush with the end face of the puck.

The retention feature may comprise a rigid protruding edge of the plate which overhangs the window. This may be connected to the main body of the plate by a stepped shoulder that could be formed by pressing or stamping of the plate during production, a step in the plate being formed at the joint between the joggled protruding edge and the main body which defines an edge of the window.

The tab or protruding edges may be sufficiently rigid that they do not deform during assembly or may be arranged to resiliently deform on assembly.

The magnet may have a cross section that is complimentary to the outline of the window in the plates.

Each plate may include a plurality of windows, aligned along the stack to form a corresponding plurality of pockets that each contain at least one magnet. A retaining feature of the kind claimed may be provided for each pocket at the first end of the stack.

Similarly, at the second end of the stack the magnet may also extend into a window in the outermost plate so that it is flush with an outer face of a main body of that plate and again may be secured by a retaining feature of the kind claimed.

The magnet may therefore be the same length as the stacked main bodies of the plates, albeit that unless a recess is provided in the end of the magnet the retention features will protrude beyond the ends of the magnet and main bodies. The window in this case extends right through the stack from the first end to the second end including extending through the outermost plates.

Importantly, even where the tab is flush with the end of the plate or even slightly below the end face the magnet at least partially extends into the window in the end plate allowing it to be longer than possible with an end plate with no window.

The stack may comprise a unitary stack of plates, each secured to an adjacent plate by a mechanical joint.

Alternatively, the stack may comprise two or more substacks or pucks that are secured to each other.

The rotor structure may comprise one stack or a plurality of stacks located end to end along the shaft. For instance, it may comprise two or three or four stacks, each one having a first and second end with respective retaining features.

The plates in the core may be secured to adjacent plates by a mechanical interlock connection, for example by semi-shearing the plates during assembly.

According to a second aspect the invention provides a motor including a rotor structure according to the first aspect of the invention.

According to a second aspect the invention provides a method of assembling a rotor structure for an interior permanent magnet electric motor comprising:

providing a plurality of thin plates, each having a main body with two opposing major faces, a central opening and at least one window;

fixing a set of the plates together to form a laminated rotor core having a first end and a second end, the at least one window in each plate being aligned with a corresponding window of an adjacent plate so that the windows together form an elongate pocket that extends along at least a part of the length of the core starting at a first end of the core, locating a permanent magnet in the pocket that has a first end that protrudes slightly from the first end of the stack; and securing a further plate to the first end of the stack that includes an integral retention feature which projects away main body of the plate to project above a window in the plate that receives the protruding end of the magnet so that the retention means engages the first end of the magnet thereby to retain the magnet in the pocket.

The method may also comprise adding a second additional plate to the opposite, second, end of the stack, the second additional plate also including an integral retention feature which projects away from the main body of the plate to project above a window in the plate that receives the protruding end of the magnet so that the retention means engages the first end of the magnet thereby to retain the magnet in the pocket.

The method may comprise carrying out the steps in the order listed in the preceding paragraph, or in an alternative order. For example, the magnets may be placed in the partially complete pockets before the end plates are secured. Or the end plates may be secured to one end only before the magnet and the other end plate then secured.

In an alternative the method may comprise securing some of the plates together to form at least two partial stacks that together are placed end to end, in contact or spaced apart by another stack of plates, in which each substack includes an additional end plate with a retention feature, and the placing the two substacks onto respective ends of a magnet that enters the pocket in each substack. Once secured together the substacks form one whole stack of puck. Two or more pucks may be produced and placed end to end to form the rotor core.

The method may comprise providing a retention feature on the additional plate that lies at least partially within the window prior to assembly and which is resiliently deformed on assembly as the magnet enters the window and pushes the retention feature out of the plane of the plate.

Alternatively it may comprise providing a plate in which the retention feature is located outside of the window offset from the plane of the main body prior to assembly. In this case, it should be located precisely at the end of the window to retain the magnet in the correct position flush, or substantially flush, with the outer face of the outermost plate of the stack.

The retention features may be formed as an integral part of the endmost plates by deformation of a flat plate, using a stamping, cutting, pressing or other manufacturing technique or combination of different techniques.

The method may comprise securing the two substacks together to retain the magnet in a single stack of core.

Other advantages of this invention will become apparent to those skilled in the art from the following detailed description of the preferred embodiments, when read in light of the accompanying drawings.

DETAILED DESCRIPTION OF THE INVENTION

Figure 1:
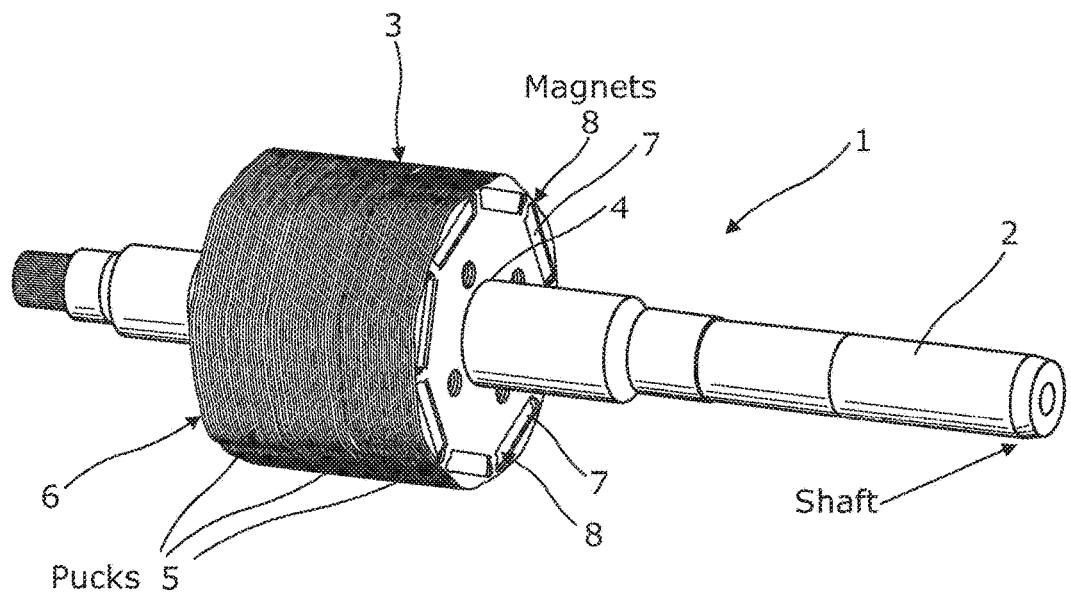
FIG. 1 is a perspective view of a typical rotor structure of an interior permanent magnet motor.
Figure 2:
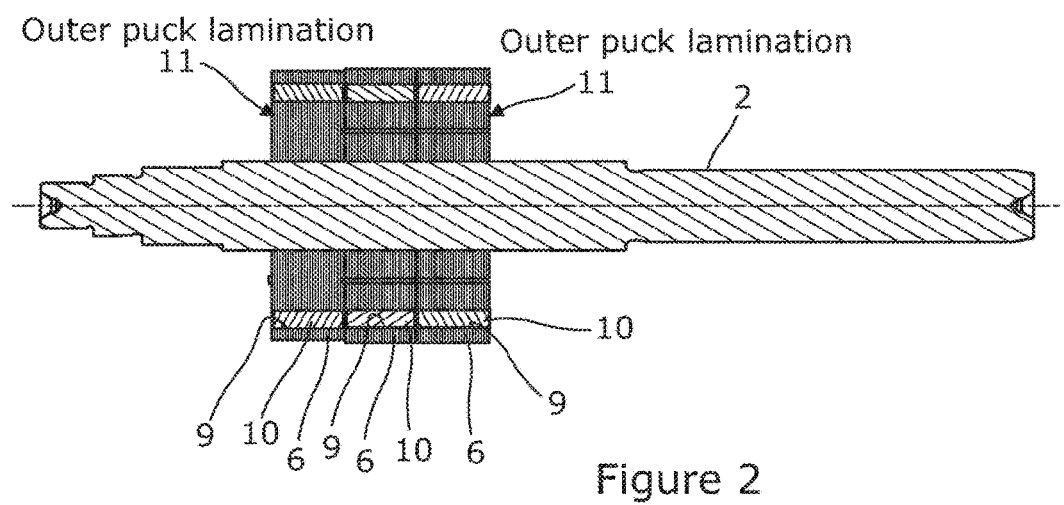
FIG. 2 is a section view of the structure of FIG. 1 showing the end plates that locate and retain the magnets in the pockets of the laminated rotor core.

FIG. 3(a) is a front view of a rotor structure 20 in accordance with a first aspect of the invention and FIG. 3(b) is a section view taken on the line BB in FIG. 3(a). The rotor structure 20 comprises a rotor core that comprise three discrete laminated stacks, or pucks 21, of thin, generally circular, metal plates. Each puck is substantially identical and so only one is shown (FIG. 1 shows how the three can be stacked together).

Each stack or puck 21 has a first end 24 and a second end 25, and each plate in the stack 21 includes at least one window which is aligned with a corresponding window of an adjacent plate so that the windows together form an elongate pocket 23 that extends along at least a part of the length of the core starting at a first end of the core. In this example each plate has eight windows.

Each set of windows forms a pocket inside of which a permanent magnet 22 is located. The magnet has a first end aligned with the first end of the stack and a second end aligned with the second end of the stack.

Figure 3:
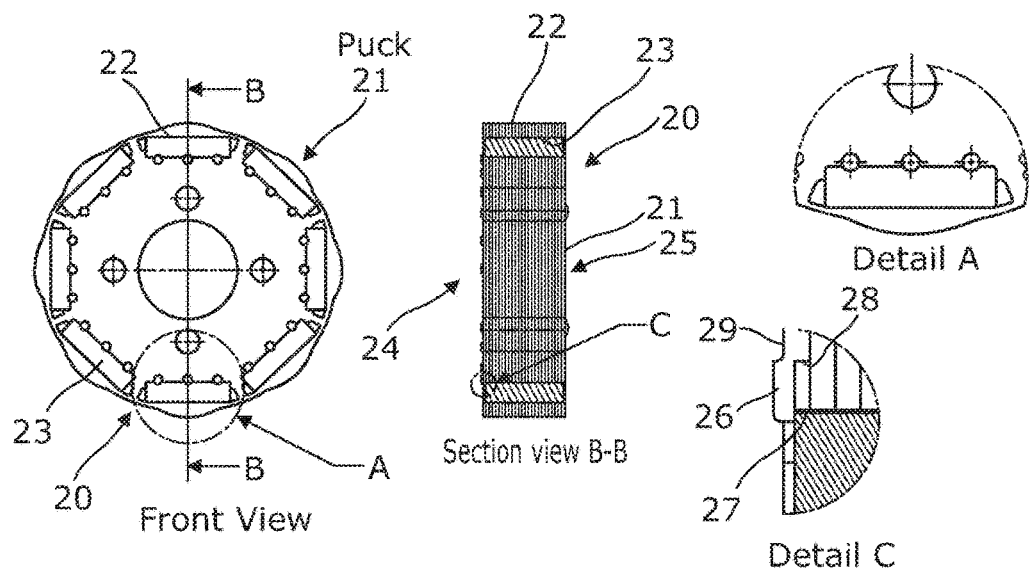
FIG. 3 is a set of views of a first embodiment of a rotor core in accordance with an aspect of the invention.

The detail view of portion A shown in FIG. 3(*c*) shows clearly a retention feature 26 provided on each end (outermost) plate of the stack 21. This is omitted from the intervening plates which simply have a window that the magnet can pass through.

The retention feature 26 comprises a projecting lip 27 that is spaced apart from the main body 29 of the plate away from the rest of the stack. This lip 27 contacts and end face of the magnet as shown in Detail C in FIG. 3(*d*). It is formed by stamping or pressing the main body of the end plate before assembly to provide a stepped portion alongside the window, with a defined shoulder 28. The tab projects away from the main body to project over the window.

In the embodiment of FIG. 1 the tab also extends beyond the end face of the end plate, so that it is not flush with the top face of the end plate. The retaining feature 26 therefore allow the magnet 22 to be located in the window in the end plate so that it is flush with the outer face of the main body of the end plate. It retains the magnet in the pocket, which will allow the magnet to be retained without glue if desired.

Figure 4:
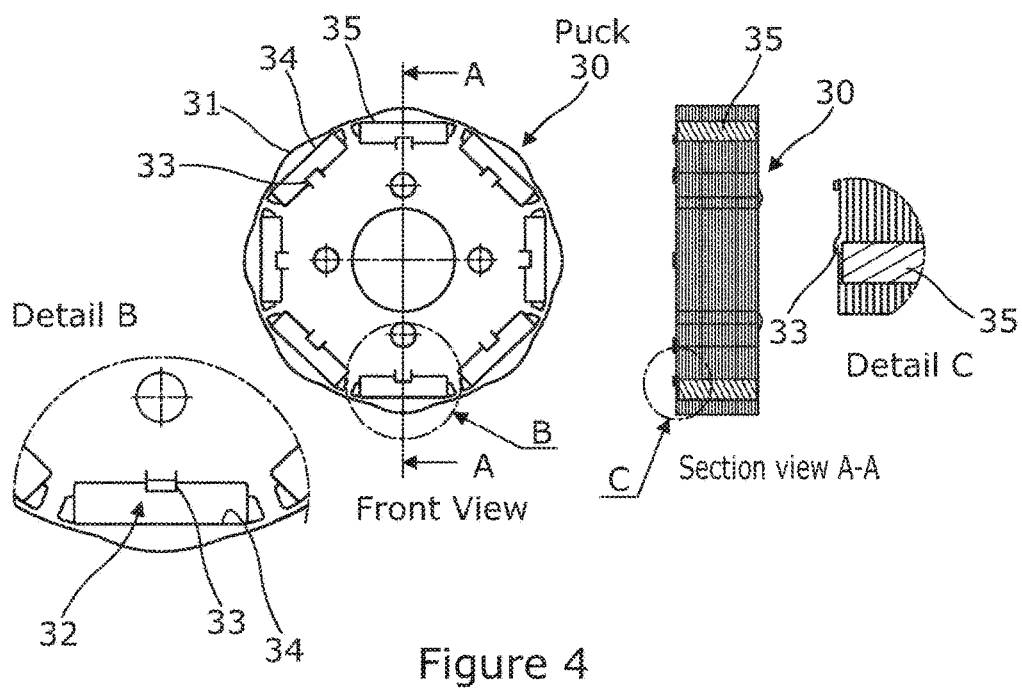
FIG. 4 is a set of views of a second embodiment of a rotor core in accordance with an aspect of the invention.

FIG. 4 shows a similar rotor structure that can be formed in accordance with an aspect of the invention. In this embodiment a puck 30 has a set of laminated plates and an end plate 31 with a retention feature 32. The lip is omitted and an alternative retention feature 32 is provided. This comprises a resilient tab 33 which prior to assembly projects away from the main body and so projects into the window 34 but does not extend beyond the end face of the plate.

When assembled, the end of the magnet 35 enters the window and pushes the tab out of the way, putting it under load. Care must be taken in this arrangement that the force exerted by the tab when assembled does not exceed that force that would cause the stack plate to delaminate. However, the resilient deformation of the tab may in some cases provide a more secure location of the magnet axially, allowing for tolerances in the length of the stack and magnet to be accommodated.

Figure 5:
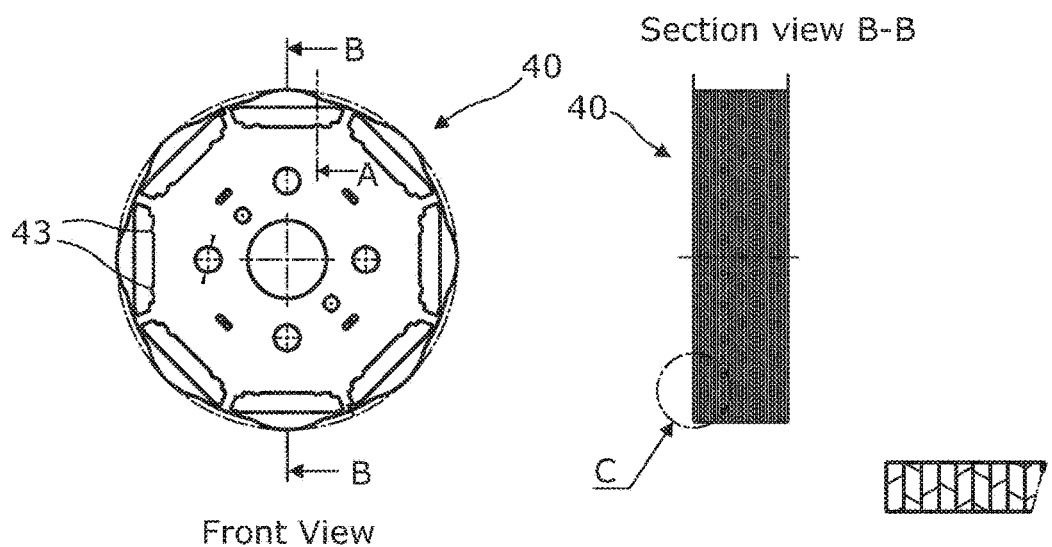
FIG. 5 shows a set of views of a third embodiment of a rotor core in accordance with an aspect of the invention.
Figure 5:
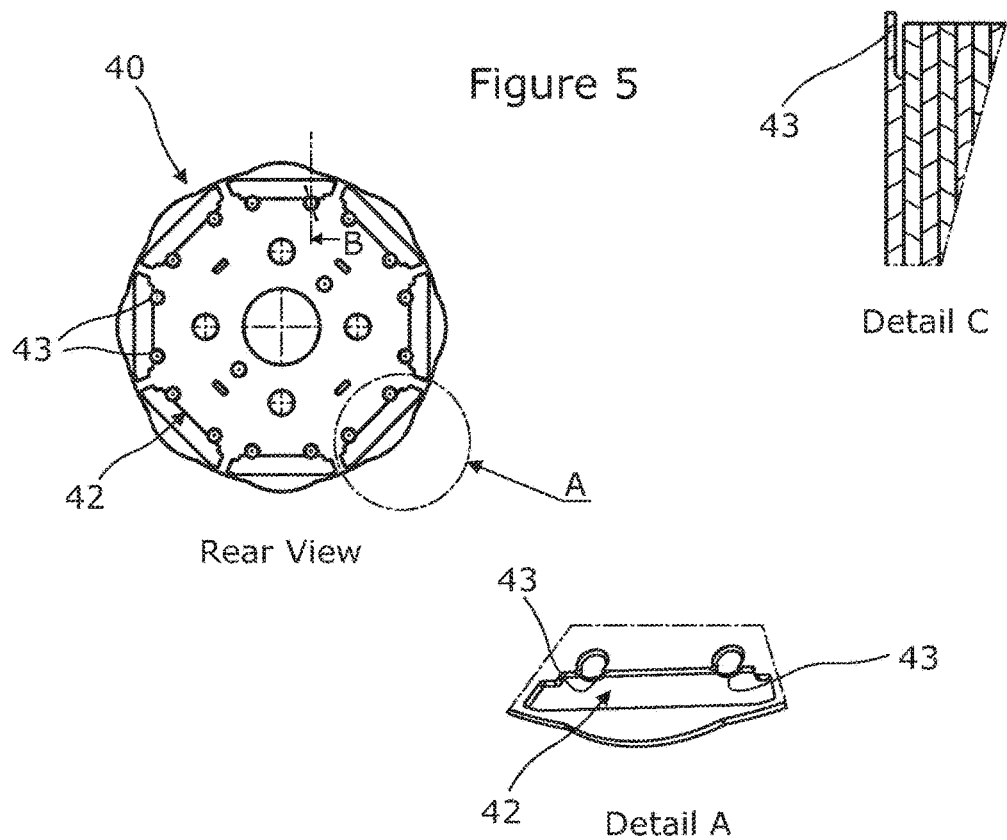

FIG. 5 shows a further embodiment of a rotor structure. This differs from the first two embodiments in that a puck 40 is provided that has retention features 43 in the form of tabs that project away from the main body of the plate and project across the window do not project beyond the end face of the outer plate but are flush with it when the magnet is in position. This requires magnets that are a little shorter, or that have small recesses that complement the tabs as they can only extend part way through the window 42 in the outer plate. However the benefit is that the pucks 40 can be stacked any way round because the end faces can be completely flush.

To allow space for the magnet, the tabs 43 are thinner than the thickness of the end plate. In this example, the end lamination has a thickness of 0.5 mm and the tabs a thickness of 0.25 mm. This is achieved by the use of a planishing operation, starting with a plate of a uniform 0.5 mm thickness.

FIG. 5 shows the puck 40 end lamination viewed from the front and the rear (not visible when the puck is assembled). The tabs 43 comprise two half moon projections for each window, formed by planishing a circular area that partially overlaps the edge of the window.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A rotor structure for an interior permanent magnet electric motor comprising:
    a laminated rotor core which comprises at least one stack of thin plates, the stack having a first end and a second end, each plate in the stack including at least one window which is aligned with a corresponding window of an adjacent plate so that the windows together form an elongate pocket that extends along at least a part of a length of the core starting at a first end of the core, and
    at least one permanent magnet located in the pocket,
    wherein at least one plate at the first end of the stack includes an integral retention feature which extends away from a main body of the plate to project above the window in the plate and which engages an end of the magnet thereby to retain the magnet in the pocket.

2. The rotor structure according to claim 1 in which the at least one plate is an outermost plate of the stack.

3. The rotor structure according to claim 1 in which the retention feature retains the magnet so that an end face of the magnet is substantially flush with a face of the main body of an endmost plate of the stack that faces away from the stack.

4. The rotor structure according to claim 1 in which the main body of the plate comprises a substantially flat plate having opposed upper and lower planar faces.

5. The rotor structure according to claim 1 in which the retention feature comprises a deformable tab which is deformed out of a plane of the main body by the magnet during assembly so that the tab applies a compressive force to the magnet biasing it in a direction away from the first end of the stack.

6. The rotor structure according to claim 1 in which the retention feature comprises a rigid protruding edge of the plate which overhangs the window and is connected to the main body of the plate by a stepped shoulder that is formed by pressing or stamping or planishing of the plate during production.

7. The rotor structure according to claim 1 in which the magnet is the same length as the stacked main bodies of the plates.

8. The rotor structure according to claim 1 in which the rotor core comprises two or more stacks of plates.

9. An interior permanent magnet motor including a rotor structure according to claim 1.

10. A method of assembling a rotor structure for an interior permanent magnet electric motor comprising:
    providing a plurality of thin plates, each having a main body with two opposing major faces, a central opening and at least one window;
    fixing a set of the plates together to form a laminated rotor core having a first end and a second end, the at least one window in each plate being aligned with a corresponding window of an adjacent plate so that the windows together form an elongate pocket that extends along at least a part of the length of the core starting at a first end of the core, locating a permanent magnet in the pocket that has a first end that protrudes slightly from the first end of the stack; and securing a further plate to the first end of the stack that includes an integral retention feature which projects away from the main body of the plate to project above a window in the plate that receives the protruding first end of the magnet so that the retention means engages the first end of the magnet thereby to retain the magnet in the pocket.

11. The method according to claim 10 which further comprises adding a second additional plate to an opposite, second, end of the stack, the second additional plate also including an integral retention feature which projects away from the main body of the plate to project above a window in the plate that receives the protruding first end of the magnet so that the retention means engages the first end of the magnet thereby to retain the magnet in the pocket.

12. The method according to claim 11 which comprises providing a retention feature on the second additional plate that lies at least partially within the window prior to assembly and which is resiliently deformed on assembly as the magnet enters the window and pushes the retention feature out of the plane of the plate.

* * * * *